Jan. 6, 1953            J. R. RUSSELL            2,624,386
DRIVEN NUT
Filed March 12, 1947
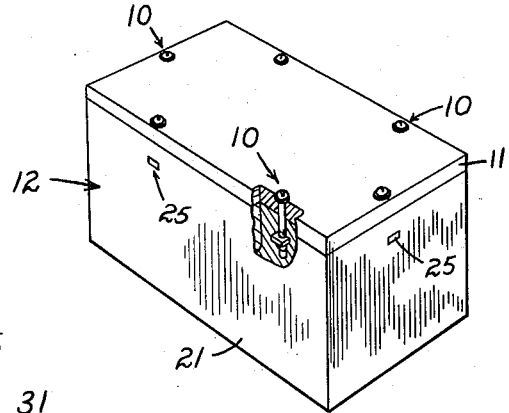
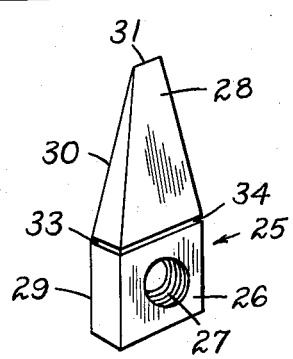
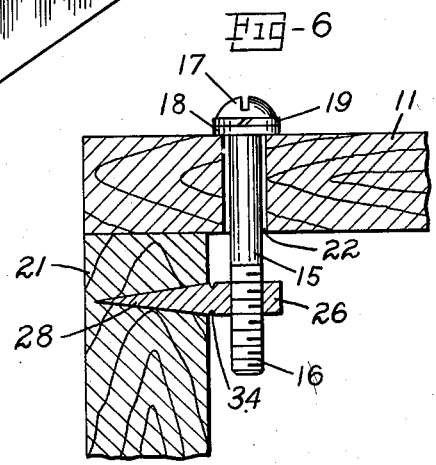
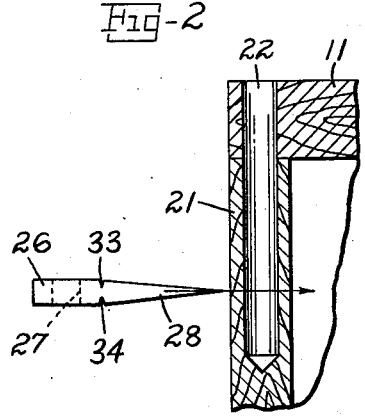
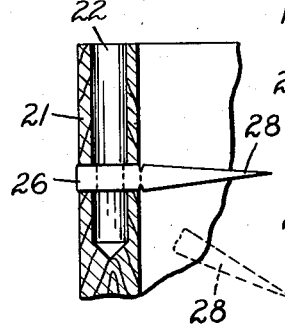
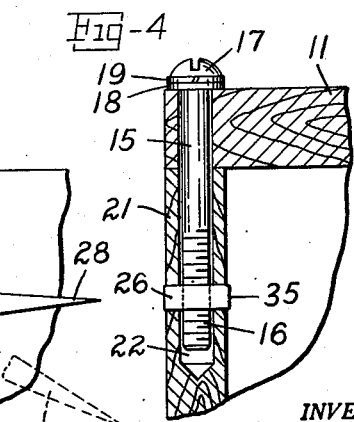
INVENTOR.
John R. Russell
BY
Marshall & Biebel
ATTORNEYS Patented Jan. 6, 1953

2,624,386

UNITED STATES PATENT OFFICE 2,624,386

DRIVEN NUT

John R. Russell, Dayton, Ohio

Application March 12, 1947, Serial No. 734,163

1 Claim. (Cl. 151—41.73)

This invention relates to a wood fastening means, and more particularly to an improved means for detachably joining two wooden members to form a tight joint.

One of the principal objects of this invention is to provide a fastening means for securing, for example, covers on wooden boxes and the like, which can be quickly and easily installed to form a secure and tight joint, and which is readily detachable without damage to the wooden members so that the box can be reused and the cover repeatedly replaced without requiring new pieces.

Another object is to provide a fastening means for detachably joining two wooden members at substantially right angles to each other which can be installed with a minimum of time and effort and without requiring the use of special tools or skilled labor, and which can be economically manufactured, used and reused to provide a secure and tight joint with a minimum of cost.

Other objects and advantages of this invention will be apparent from the following description, the accompanying drawings, and the appended claim.

In the drawing:

Fig. 1 is a perspective view of a wooden box, a portion of which is broken away to illustrate fastening means made in accordance with the present invention shown in position to detachably hold the cover in place.

Fig. 2 is a partial side sectional view through the cover and side wall of Fig. 1 showing the driven member of the fastening means in position to be driven into the side wall;

Fig. 3 is a view similar to Fig. 2, the cover having been removed and showing the point of the driven member extending into the interior of the box, the point broken off being shown in dotted lines;

Fig. 4 is also a view similar to Fig. 2 showing the cover back in place, the bolt having been inserted and in engagement with the driven member;

Fig. 5 is an enlarged perspective view of the driven member; and

Fig. 6 is a partial side sectional view showing a modified way of detachably joining two wooden members with the fastening means illustrated in Fig. 1.

Referring more particularly to the drawings, in Fig. 1 a plurality of wood fastening means constructed in accordance with the present invention, and generally referred to by the reference numeral 10, are shown spaced around the cover 11 of a wooden box 12. It will be readily apparent, however, that the fastening means 10 is also adaptable to uses other than detachably securing covers to boxes, and that it can also be used for securing a tight detachable joint between any two wooden members which are to be held at substantially right angles to each other.

The fastening means, generally illustrated in the drawings, comprises a bolt 15 of standard manufacture, the lower end of which is threaded as at 16 and the upper end of which is provided with a slotted head 17. A metal washer 18 and a lock washer 19 are also provided to prevent the bolt from turning or working loose after it has been tightened in position in the usual manner.

As illustrated, the members to be detachably joined, for example, the box cover 11 and the side wall 21, are drilled in any convenient manner to provide a bore 22 of sufficient diameter and depth to receive the bolt 15, the head 17 and the washers 18 and 19 bearing against the upper surface of cover 11 when the bolt 15 is tightened in the usual manner.

A generally wedge shaped member 25 is also provided and this member is adapted to be driven as by means of a hammer into the side wall 21 for example. This member has at one end thereof a substantially square body portion 26 which has a threaded aperture 27 formed therein adapted to receive the threaded end 16 of the bolt 15. It is also preferred that the body portion be of substantially the same length as the thickness of the cover or wall into which it is driven, as shown most clearly in Fig. 4 when that type of construction is used. The other end of body portion 26 is formed to provide an elongated chisel point 28 which is preferably constructed so as to be substantially twice the length of the body portion 26. Thus if the body portion 26, for example, is substantially ¼ inch along the edge 29, Fig. 5, the point 28 is approximately ½ inch in length along the line 30, and in such case the point is about ⅛ inch in width along the line 31.

It has been found that with the pointed portion of the body member 26 constructed with a substantially obtuse or chisel type of cutting surface, along the line 31, that it is more easily driven and also tends to guide the wedge member 25 in a substantially horizontal plane so that the aperture 27 readily aligns in the proper position to receive the threaded end of bolt 15.

The wedge member 25 is also preferably provided with scored surfaces or grooves 33 and 34 in each side thereof which establish a fracture plane lying between them to facilitate breaking off that portion of the point 28 which projects beyond the inner surface of the member into which it is driven, when it is desired to provide a substantially smooth or flush finished wall surface, as illustrated at 35 in Fig. 4. However, if preferred, the wedge member 25 may be driven into position as illustrated in Fig. 6 to provide a fastening means which is not entirely concealed or imbedded in the side wall. This type of construction may be preferred especially where the side wall is of greater thickness than the total overall length of the wedge member.

In operation it will be apparent that after the bore 22 has been made through the members 11 and 21, the wedge member 25 is driven into position in the side wall 21 at a point substantially above the bottom of the bore as illustrated in Figs. 2-4, or until it is sufficiently imbedded to be solidly held in position as shown in Fig. 6, depending upon the type of joint preferred. If the pointed portion of the wedge member projects from the inner wall surface it can be broken off flush therewith by a relatively light blow. However, if preferred the wedge member 25 can be driven into position and then the bore 22 drilled particularly where the construction illustrated in Fig. 6 is to be used.

From the above description it will be apparent that there has been provided an improved type of wood fastening means for detachably joining two wooden members to form a tight joint, which can be quickly and easily installed or detached without the use of special tools or skilled labor, and which is economical to manufacture and use.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

A fastening device adapted for use with a machine screw to form a detachable joint between a wooden member and another member, comprising a generally square and flat body of substantially greater width than thickness to form a nut having a tapped bore therethrough for receiving said screw, an elongated extension formed integrally with said nut and extending therefrom in substantially the plane of said nut, the sides of said extension converging with a relatively gradual taper from said nut to form a chisel point at the outer end thereof lying generally parallel with said plane of said nut for penetrating the wall of said wooden member, the edge of said nut opposite said extension being substantially flat to facilitate driving said extension into said wall, said extension being substantially longer than the width of said nut and having said gradually tapered sides over substantially the entire length thereof to spread said wall properly for driving said nut into said wall and also to resist withdrawal from said wall following partial driving thereinto for supporting said nut in projecting relation with said wall in position to receive said screw, said device having a groove therein along the integral connection between said nut and said extension rendering said connection readily frangible to a blow to facilitate breaking off of said extension in an installation of said device wherein said extension is driven completely through said wall leaving said nut embedded therein, and said groove being of substantially less depth than the thickness of said nut to provide sufficient thickness of material in said connection to withstand the pulling force caused by tightening of said screw in an installation of said device wherein said extension is driven partially into said wall and supports said nut outwardly of said wall.

JOHN R. RUSSELL.

REFERENCES CITED

The following references are of record in the file of this patent:

UNITED STATES PATENTS

| Number | Name | Date |
|---|---|---|
| 363,866 | Walker | May 31, 1887 |
| 456,723 | Harvey | July 28, 1891 |
| 735,078 | Felsing et al. | Aug. 4, 1903 |
| 973,144 | Staples | Oct. 18, 1910 |
| 1,007,747 | Stine | Nov. 7, 1911 |
| 1,394,608 | Davern | Oct. 25, 1921 |
| 1,511,746 | Noll | Oct. 14, 1924 |

FOREIGN PATENTS

| Number | Country | Date |
|---|---|---|
| 561,627 | Great Britain | May 26, 1944 |
| 585,887 | Great Britain | Feb. 27, 1947 |
| 64,979 | Norway | 1942 |